United States Patent Office 3,134,812
Patented May 26, 1964

---

3,134,812
POLYOXYALKYLENE GLYCOL MONOETHERS OF AROMATIC AMINE DERIVATIVES OF HALOCYCLOALKENES
Louis Schmerling, Riverside, and Herman S. Bloch, Skokie, Ill., assignors to Universal Oil Products Company, Des Plaines, Ill., a corporation of Delaware
No Drawing. Filed Nov. 6, 1959, Ser. No. 851,235
8 Claims. (Cl. 260—573)

This application is a continuation-in-part of our copending application Serial No. 732,803 filed May 5, 1958, now abandoned.

This invention relates to new insecticidal compositions and to a method for the preparation thereof. More specifically the invention relates to a method for preparing an N-(ω-hydroxy)polyoxyalkylene derivative of an aminoaryl-substituted halocycloalkene.

Insecticidal compositions which are soluble in water and, in addition, are surface-active agents have many advantages over the conventional type of insecticide. Advantages which may be found in having such an insecticide are the elimination of the need of an emulsifying agent in preparing an aqueous solution of the insecticide, as well as a reduction in the cost of the preparation of said solution. Furthermore, the solutions are surface-active and when used in detergent formulations will yield clean surfaces which retain insecticidal properties after the cleansing operation is completed.

It is therefore an object of this invention to prepare water-soluble surface-active insecticidal compositions.

A further object of this invention is to prepare an N-(ω-hydroxy)polyoxyalkylene derivative of an aminoaryl-substituted halocycloalkene.

One embodiment of this invention resides in a process for the preparation of an N-(ω-hydroxy)polyoxyalkylene derivative of an aminoaryl-substituted halocycloalkene which comprises condensing an unsaturated side chain derivative of an aromatic amine with a halo-substituted conjugated unsaturated compound selected from the group consisting of haloalkadienes and halocycloalkadienes, reacting the resultant condensation product with an alkylene oxide, and recovering the desired N-(ω-hydroxy)polyoxyalkylene derivative of an aminoaryl-substituted halocycloalkene.

A specific embodiment of the invention is found in a process for the preparation of an N-(ω-hydroxy)polyoxyalkylene derivative of an aminoaryl-substituted halocycloalkene which comprises condensing o-allylaniline with hexachlorocyclopentadiene at a temperature in the range of from about 20° to about 250° C., reacting a molecular proportion of the resultant 1,2,3,4,7,7-hexachloro-5-(o-aminobenzyl)-2-norbornene with 2 molecular proportions of ethylene oxide, and recovering the resultant 1,2,3,4,7,7 - hexachloro - 5 - [N - (5 - hydroxy - 3 - oxapentyl)-o-aminobenzyl]-2-norbornene.

Yet another embodiment of this invention resides in a compound having the structural formula:

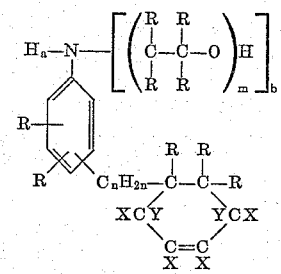

or

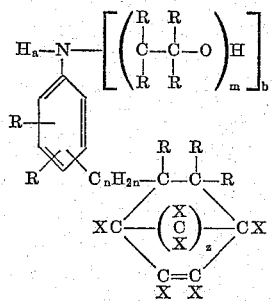

in which the R substituents are selected from the group consisting of hydrogen, methyl and ethyl radicals, the X substituents are selected from the group consisting of hydrogen, methyl and halogen radicals, the Y substituents are selected from the group consisting of hydrogen, methyl and halomethyl radicals, $m$ is an integer of from 1 to about 20, $n$ is an integer of from 0 to 1, $z$ is an integer of from 1 to 2, $b$ is an integer of from 1 to 2 and $a$ is $(2-b)$.

Another specific embodiment of the invention resides in 1,2,3,4,7,7 - hexachloro - 5 - [N - (11 - hydroxy - 3,6,9-trioxa - 2,5,8 - trimethylundecyl) - p - aminobenzyl] - 2-norbornene.

Other objects and embodiments referring to alternative unsaturated side chain derivatives of an aromatic amine, to alternative halo-substituted conjugated alkadienes and halo-substituted cycloalkadienes and to alternative alkylene oxides will be found in the following further detailed description of the invention.

The compounds formed by the process of this invention will find a wide variety of uses in the chemical field especially as insecticides, and more particularly as water-soluble surface-active insecticides. For example, the condensation product which results from the reaction between hexachlorocyclopentadiene and p-allylaniline followed by condensation of the resultant product with 2 moles of ethylene oxide, namely, 1,2,3,4,7,7-hexachloro-5 - [N - (5 - hydroxy - 3 - oxapentyl) - p - aminobenzyl]-2-norbornene is active as an insecticide, especially against houseflies. In addition, the reaction products of this invention may also be used as intermediates in the preparation of resins, pharmaceuticals, plastics, etc. For purposes of this invention, the term "halocycloalkenes" will refer to halocycloalkenes, polyhalocycloalkenes, halobicycloalkenes and polyhalobicycloalkenes. In addition, the term "halo" will refer to both mono- and polyhalo compounds.

The process of this invention in which the halo substituted conjugated diolefins, either straight chain or cyclic, is condensed with the unsaturated side chain derivative of an aromatic amine takes place at temperatures in the range of from about 20° to about 250° C. and often preferably at a temperature in the range of from about 80° to about 180° C., the reaction temperature being dependent upon the particular reactants which are to be condensed. Generally speaking, the reaction will take place at atmospheric pressure; however, if higher temperatures are to be used when condensing a lower boiling halogenated diene with the unsaturated side chain derivative of the aromatic amine, superatmospheric pressures ranging from about 2 to about 100 atmospheres or more will be used, the amount of pressure used being that necessary to maintain at least a portion of the reactants in the liquid phase. In addition, if so desired, the reaction may take place in the presence of inert organic solvents including aromatic solvents such as benzene, toluene, o-, m- and p-xylene, ethylbenzene, etc., alcohols such as methyl alcohol, ethyl alcohol, propyl alcohol, etc.; ethers such as dimethyl ether, diethyl ether, dipropyl ether, etc., saturated low molecular weight aliphatic hydrocarbons such as pentane, hexane, heptane, etc.; or other inert solvents, in which case the reaction temperature will approximate the reflux temperature of the solvent.

The condensation step between the reaction product of the halo-substituted conjugated diene and the unsaturated side chain derivative of the aromatic amine, and the alkylene oxide will also be effected at temperatures and pressures similar to those stated in the above paragraph, namely, at temperatures in the range of from about 20° to about 250° C. and at pressures ranging from about atmospheric to about 100 atmospheres or more, both temperature and pressure being dependent upon the particular reactants undergoing condensation. The same products may also be made by reversing the order of the two reactions—i.e. by the reaction of the halo-substituted conjugated diene with the condensation product of an alkylene oxide and an aromatic amine having an unsaturated side chain.

The desired water soluble insecticide will have the generic formula:

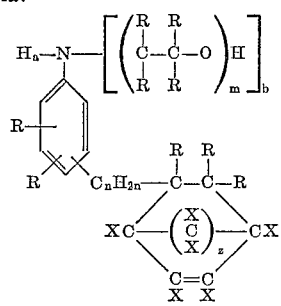

if a halocycloalkadiene is used, where $z$ is 1 or 2, or the generic formula:

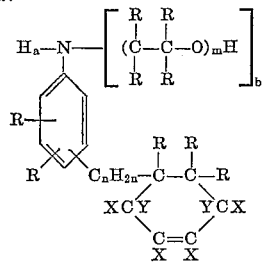

if the haloalkadiene is used. In the above formulae the several R substituents are independently selected from the group consisting of hydrogen, methyl and ethyl radicals, the several X substituents are independently selected from the group consisting of hydrogen, methyl, and halogen radicals, the Y substituents are independently selected from the group consisting of hydrogen, methyl and halomethyl radicals, $m$ is an integer of from 1 to about 20, $n$ is an integer of from 0 to 1, $b$ is 1 or 2 and $a$ is $(2-b)$. The value of the integer "$m$" in the above formulae will depend upon the mole ratio of the alkylene oxide to the condensation product of the reaction between the unsaturated side chain derivative of the aromatic amine and the halocycloalkadiene or haloalkadiene. For example, if $b$ is 1 and $m$ is 2, the mole ratio of the alkylene oxide to the aforementioned condensation product is 2:1, if $m$ is 3 the mole ratio is 3:1 and so on as $m$ increases in size.

Unsaturated compounds containing a halogen substituent which may be reacted with the unsaturated side chain derivative of an aromatic amine in the process of the present invention include straight-chain diolefins having the general formula:

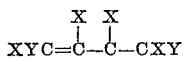

in which the X's are selected from the group consisting of hydrogen, methyl or halogen radicals, the preferred halogens having an atomic weight of from 35 to 127 (i.e. chlorine, bromine, or iodine), at least one X being halogen or haloalkyl and the Y's are selected from the group consisting of methyl, halomethyl, and hydrogen radicals; or polyhalocycloalkadienes having the general formula:

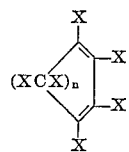

in which X has the same meaning as above and $n$ is 1 or 2. Examples of these compounds include haloalkadienes such as 1- and 2-chloro-1,3-butadiene, 1,3-, 2,3- and 1,4-dichloro-1,3-butadiene, 1- and 2-bromo-1,3-butadiene, 1, 3-, 2,3- and 1,4-dibromo-1,3-butadiene, 1,3-, 2,3- and 1,4-diiodo-1,3-butadiene, 1,2,3-trichloro-1,3-butadiene, 1,2,3-tribromo-1,3-butadiene, 1- and 2-iodo-1,3-butadiene, 1,2-diiodo-1,3-butadiene, 1,2,3-triiodo-1,3-butadiene, 1,2,4-trichloro-1,3-butadiene, 1,2,4-tribromo-1,3-butadiene, 1,2,4-triiodo-1,3-butadiene, 1,2,3,4-tetrachloro - 1,3 - butadiene, 1,2,3,4-tetrabromo-1,3-butadiene, 1,2,3,4-tetraiodo - 1,3 - butadiene, 1,3-dichloro-2-methyl - 1,3 - butadiene, 1,4-dichloro-2-methyl-1,3-butadiene, 1,3,4-trichloro - 2 - methyl-1,3-butadiene, 1,3-dichloro-2-chloro-methyl-1,3-butadiene, 1,4-dichloro-2-dichloromethyl - 1,3 - butadiene, 1,3-dibromo-2-methyl-1,3-butadiene, 1,4-dibromo-2-methyl-1,3-butadiene, 1,3-dibromo-2-bromo-methyl-1,3-butadiene, 1,4-dibromo-2-dibromomethyl-1,3-butadiene, 1,3,4 - tribromo-2 - methyl-1,3-butadiene, 1,3-diiodo-2-methyl - 1,3 - butadiene, 1,4-diiodo-2-methyl-1,3-butadiene, 1,3-diiodo-2-iodomethyl-1,3-butadiene, 1,4-diiodo-2-iodomethyl-1,3-butadiene, 1,3,4-triiodo-2-methyl-1,3-butadiene, etc.; and halocycloalkadienes such as halogenated 1,3-cyclopentadienes which for purposes of this invention will be designated as halogenated cyclopentadienes including 1-chlorocyclopentadiene, 1,2- and other dichlorocyclopentadienes, 1,2,3- and other trichlorocyclopentadienes, 1,2,3,4- and other tetrachlorocyclopentadienes, 1,2,3,4,5-, and other pentachlorocyclopentadienes, hexachlorocyclopentadiene, the corresponding bromo- and iodo- derivatives, etc. It is also contemplated within the scope of this invention that polyhalo-substituted conjugated cyclohexadienes such as 1,2-dichloro-1,3-cyclohexadiene, 1,2,3-trichloro-1,3-cyclohexadiene, octachloro-1,3-cyclohexadiene, etc., 1,2-dibromo-1,3-cyclohexadiene, 1,2,3-tribromo - 1,3 - cyclohexadiene, octabromo-1,3-cyclohexadiene, 1,2-diiodo - 1,3 - cyclohexadiene, 1,2,3-triiodo-1,3-cyclohexadiene, octaiodo-1,3-cyclohexadiene, etc., may also be used. Furthermore, it is contemplated within the scope of this invention that flourine analogs of the aforementioned unsaturated compounds such as hexafluorocyclopentadiene or 2,3-difluoro-1,3-butadiene may also be used, although not necessarily with equivalent results. Generally speaking the iodine, bromine and chlorine containing compounds are preferred, and particularly the chlorine compounds because of their relatively greater availability and lower cost. In addition, it is also contemplated that polyhaloalkadienes and polyhalocycloalkadienes which are used in this process may contain more than one species of halo substituents, such as, for example, 1,2-dichloro-3-bromo-1,3-butadiene, 1-chloro-3-bromo-1,3-butadiene, 1-iodo-3-chloro-1,3-butadiene, 2 - bromo-3-chloro-1,3-butadiene, 1,4-dichloro-2-bromomethyl-1,3-butadiene, 1,4-dichloro-2-iodomethyl-1,3-butadiene, 1 -chloro-2-bromocyclopentadiene, 1,2-dichloro-3-bromocyclopentadiene, 1,2-dichloro-5,5-dibromocyclopentadiene, etc., although not necessarily with equivalent results.

Unsaturated side chain derivatives of an aromatic amine having the general formula:

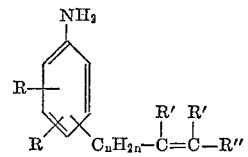

in which the R substituents are selected from the group consisting of hydrogen, methyl or ethyl radicals, the R' substituents are selected from the group consisting of hydrogen or methyl radicals, the R" substituents are selected from hydrogen and alkyl radicals containing from 1 to about 4 carbon atoms, and $n$ is an integer of from 0 to 1 include o-vinylaniline, m-vinylaniline, p-vinylaniline, o-allylaniline, m-allylaniline, p-allylaniline, o-crotylaniline, m-crotylaniline, p-crotylaniline, o-methallylaniline, m-methallylaniline, p-methallylaniline, o-(4-pentenyl)aniline, the isomeric o-, m- and p-hexenyl, heptenyl, octenyl, nonenyl and decenyl substituted anilines, etc., 3-vinyl-o-toluidine, 3-allyl-o-toluidine, 3-crotyl-o-toluidine, 3-methallyl-o-toluidine, 4-vinyl-o-toluidine, 4-allyl-o-toluidine, 4-crotyl-o-toluidine, 4-methallyl-o-toluidine, 5-vinyl-o-toluidine, 5-allyl-o-toluidine, 5-crotyl-o-toluidine, 5-methallyl-o-toluidine, 4-vinyl-m-toluidine, 4-allyl-m-toluidine, 4-crotyl-m-toluidine, 4-methallyl-m-toluidine, 5-vinyl-m-toluidine, 5-allyl-m-toluidine, 5-crotyl-m-toluidine, 5-methallyl-m-toluidine, 2-vinyl-p-toluidine, 2-allyl-p-toluidine, 2-crotyl-p-toluidine, 2-methallyl-p-toluidine, 3-vinyl-p-toluidine, 3-allyl-p-toluidine, 3-crotyl-p-toluidine, 3-methallyl-p-toluidine, etc., the isomeric pentenyl, hexenyl, heptenyl, octenyl, nonenyl, and decenyl, o-, m- and p-toluidines, etc., the alkyl homologs of these toluidines, 2-vinyl-3,4-dimethylaniline,2-allyl-3,4-dimethylaniline, 2-crotyl-3,4-dimethylaniline, 2-methallyl-3,4-dimethylaniline, 2-pentenyl-3,4-dimethylaniline, 2-vinyl-4,5-dimethylaniline, 2-allyl-4,5-dimethylaniline, 2-crotyl-4,5-dimethylaniline, 2-methallyl-4,5-dimethylaniline, 2-pentenyl-4,5-dimethylaniline, etc. It is to be understood that the aforementioned aromatic amines containing an unsaturated side chain linkage are only representatives of the class of compounds which may be used and that the process of this invention is not necessarily limited thereto.

Alkylene oxides which may be used in the process of this invention comprise ethylene oxide, 1,2-propylene oxide, 2,3-butylene oxide, 1,2-pentene oxide, 2,3-pentene oxide, etc., the preferred epoxides comprising ethylene oxide and propylene oxide due to their relatively greater availability and lower cost.

The volatility of the insecticides produced according to this invention is, of course, dependent upon their molecular weight and when a product having low volatility is especially desired in a particular application, such as a high degree of rententivity or activity to which the pesticide is applied, the molecular weight may be raised both by using relatively high-boiling components in the first step of the present invention and by the choice and number of moles of alkylene oxide used in the second step.

The physical properties of the present N-(ω-hydroxy) polyoxyalkylene derivative of an aminoaryl-substituted halocycloalkene, and the effects they have on entomological forms of life make them particularly desirable as insecticides and insect repellents, the compounds having many of the features desired of materials for this purpose. They are, for example, toxic to insects which are destructive of plant life and materials normally subject to insect infestation, their toxic effects being manifested by contact of the insect with the poison. The insecticides comprising the compounds of the present invention are thus effective against chewing as well as sucking types of insects. In addition, the compounds may be made sufficiently volatile and water-soluble so that when applied to plant life intended for human consumption, the plants when harvested and after allowing a reasonable time for evaporation and dissolution of the applied insecticides therefrom (as by rainfall) retain insufficient quantities of the toxicant to prevent use of the plants as food. On the other hand, the compounds may be made of sufficiently limited volatility to be retained on the insect for the time required to accomplish their toxic effects.

If so desired, the insecticides of the present invention may be combined with water or other diluent, said diluent being employed for the specific purpose of reducing the concentration of insecticides to the desired level in specific insecticide formulations. The particular formulation of active components in combination with the solvent or dispersant will depend upon its application. Compositions containing as high as 20% of active component may be preferred in some instances to allow deep penetration of the insecticides, as in the treatment of fibrous material, such as wood, for extinction of particular infestation, for example, wood termites. For other purposes, the required concentration of active components in the formulation may be as low as 0.1% as for example in the treatment of fabrics for destroying moth larvae. In utilizing the present insecticidal compounds against most insects, a composition containing from about 0.1% to about 5% by weight of the active component is highly effective. The choice of the most desirable concentration and also whether or not the insecticide is dissolved or emulsified in water depends upon the method utilized to apply the insecticidal composition to the infested article. In addition to the use of water as a solvent, the insecticides may be dissolved in a suitable high boiling solvent or may be dispersed in a low molecular weight normally gaseous carrying agent such as propane, butane, the Freons, etc. The latter may be compressed and liquefied into a small bomb containing the insecticide, from which the liquid may be vaporized as a mist containing suspended quantities of the active component, thus providing a convenient spraying method of applying the insecticide.

The process of this invention may be effected in any suitable manner and may comprise either a batch or a continuous type operation. For example, when a batch type operation is used a quantity of the starting materials comprising an unsaturated side chain derivative of an aromatic amine, the halo substituted alkadiene or halo-substituted cycloalkadiene and, if so desired, an inert organic solvent is placed in a condensation apparatus provided with heating and mixing means. The flask is then heated to the desired temperature and pressure and maintained thereat for a predetermined period of time, at the end of which time the flask and contents thereof are allowed to cool to room temperature. The desired intermediate condensation product is separated from unreacted starting materials and by-products by conventional means such as fractional distillation, crystallization, etc.

Alternatively, the unsaturated side chain derivative of an aromatic amine and the solvent, if any, may be heated to the desired reaction temperature and the halo substituted alkadiene or cycloalkadiene may be added gradually. The intermediate condensation product of the aforementioned reaction is then placed in a separate flask or, if so desired, may be returned to the original reaction apparatus and admixed with a molecular excess of alkylene oxide. The flask and contents thereof are then heated to the desired reaction temperature and, as in the first step of the process of this invention, maintained thereat for a suitable residence time. At the end of this time the flask and contents thereof are cooled to room temperature and the desired reaction product, comprising an N-(ω-hydroxy)polyoxyalkylene derivative of an aminoaryl-substituted halocycloalkene is separated, purified and recovered by the conventional means hereinbefore set forth.

Another method of effecting the condensation reaction of the present invention is by a continuous type operation. In this type of operation the starting materials comprising the unsaturated side chain derivative of the aromatic amine and the halo-substituted alkadiene or cycloalkadiene are continuously charged to a reactor which is maintained at the proper operating conditions of temperature and pressure. The reactor may comprise an unpacked vessel or coil or may be lined with an adsorbent packing material such as fire brick, alumina, Berl saddles and the like. If so desired, an inert organic solvent of the type hereinbefore set forth may be added through a separate line or admixed with one or the other of the starting materials prior to entry into said reactor and charged thereto in a single line. The reaction product is continuously withdrawn from the reactor, separated from the reactor effluent and continuously charged to a second reactor, while the unreacted starting materials are separated and recharged to the first reactor as a portion of the feed stock. After being charged to the second reactor the intermediate condensation product is condensed with a molar excess of an alkylene oxide which is continuously charged through a separate line to the second reactor. The latter is also maintained at suitable operating conditions of temperature and pressure. The desired condensation product, comprising an N-(ω-hydroxy)-polyoxyalkylene derivative of an aminoaryl-substituted halocycloalkene is separated and purified by means similar to those hereinbefore set forth.

Examples of water-soluble surface-active insecticides which may be prepared according to this invention include 1,2-dichloro-4-[N-(5-hydroxy-3-oxapentyl)-o-aminophenyl]-1-cyclohexene,
1,2-dichloro-4-[N-(5-hydroxy-3-oxapentyl)-p-aminophenyl]-1-cyclohexene,
1,2,3-trichloro-4-[N-(5-hydroxy-3-oxapentyl)-o-aminophenyl]-1-cyclohexene,
1,2,3-trichloro-4-[N-(5-hydroxy-3-oxapentyl)-m-aminophenyl]-1-cyclohexene,
1,2-dichloro-4-[N,N-di-(2-hydroxyethyl)-o-aminophenyl]-1-cyclohexene,
1,2-dichloro-4-[N,N-di-(5-hydroxy-3-oxapentyl)-o-aminobenzy]-1-cyclohexene,
1,2-dichloro-4-[N-(8-hydroxy-3,6-dioxaoctyl)-o-aminophenyl]-1-cyclohexene,
1,2-dichloro-4-[N-(8-hydroxy-3,6-dioxaoctyl)-m-aminophenyl]-1-cyclohexene,
1,2-dichloro-4-[N-(8-hydroxy-3,6-dioxaoctyl)-m-aminobenzyl]-1-cyclohexene,
1,2,3-trichloro-4-[N-(23-hydroxy-3,6,9,12,15,18,21-heptaoxatricosyl)-p-aminobenzyl]-1-cyclohexene,
1,2,3-trichloro-4-[N-(23-hydroxy-3,6,9,12,15,18,21-heptaoxatricosyl)o-aminophenyl]-1-cyclohexene,
1,2,3,6-tetrachloro-4-[N-(5-hydroxy-3-oxapentyl)-o-aminophenyl]-1-cyclohexene,
1,2,3,6-tetrachloro-4-[N-(5-hydroxy-3-oxapentyl)-p-aminophenyl]-1-cyclohexene,
1,2-dibromo-4-[N-(5-hydroxy-3-oxapentyl)-o-aminobenzyl]-1-cyclohexene,
1,2-dibromo-4-[N-(5-hydroxy-3-oxapentyl)-m-aminobenzyl]-1-cyclohexene,
1,4-dichloro-5-[N-(5-hydroxy-3-oxapentyl)-o-aminophenyl]-2-norbornene,
2,3-dichloro-5-[N-(5-hydroxy-3-oxapentyl)-o-aminophenyl]-2-norbornene,
1,2,3-trichloro-5-[N-(5-hydroxy-3-oxapentyl)-o-aminophenyl]-2-norbornene,
1,2,3-trichloro-5-[N-(5-hydroxy-3-oxapentyl)-p-aminophenyl]-2-norbornene,
1,4-dichloro-5-[N,N-di-(5-hydroxy-3-oxapentyl)-p-aminophenyl]-2-norbornene,
2,3-dichloro-5-[N,N-di-(5-hydroxy-3-oxapentyl)-p-aminobenzyl]-2-norbornene,
1,4-dichloro-5-[N-(8-hydroxy-3,6-dioxaoctyl)-p-aminophenyl]-2-norbornene,
1,4-dichloro-5-[N-(8-hydroxy-3,6-dioxaoctyl)-o-aminobenzyl]-2-norbornene,
1,2,3-trichloro-5-[N-(23-hydroxy-3,6,9,12,15,18,21-heptaoxatricosyl)-p-aminobenzyl]-2-norbornene,
1,2,3-trichloro-5-[N-(23-hydroxy-3,6,9,12,15,18,21-heptaoxatricosyl)-o-aminophenyl]-2-norbornene,
1,2,3,4,7,7-hexachloro-5-[N-(5-hydroxy-3-oxapentyl)-o-aminophenyl]-2-norbornene,
1,2,3,4,7,7-hexachloro-5-[N-(5-hydroxy-3-oxapentyl)-p-aminophenyl]-2-norbornene,
1,2,3,4,7,7-hexachloro-5-[N,N-di-(5-hydroxy-3-oxapentyl)-o-aminobenzyl]-2-norbornene,
1,2,3,4,7,7-hexachloro-5-[N-(5-hydroxy-3-oxapentyl)-o-aminobenzyl]-2-norbornene,
1,2,3,4,7,7-hexachloro-5-[N-(5-hydroxy-3-oxapentyl)-p-aminobenzyl]-2-norbornene,
1,2,3,4,7,7-hexachloro-5-[N-(5-hydroxy-3-oxapentyl)-m-aminobenzyl]-2-norbornene,etc.

As in the case of the aforementioned reactants the above insecticides are only examples of the class of compounds which may be prepared, and the present invention is not necessarily limited thereto.

The following examples are given to illustrate the process of the present invention, which, however, are not intended to limit the generally broad scope of the present invention in strict accordance therewith.

*Example I*

A solution of 8.9 g. (0.067 mole) of o-allylaniline and 18.3 g. (0.067 mole) of hexachlorocyclopentadiene in 50 g. of toluene is heated under reflux at a temperature of about 120° C. for about 20 minutes after which time the toluene is gradually distilled off permitting the temperature of the solution to rise. After approximately 45 g. of toluene is removed during a period of about 2 hours the temperature rises to about 175° C. The solution is now heated for an additional period of 60 minutes without further removal of toluene, after which the product is allowed to cool, is taken up in pentane, washed with dilute aqueous sodium bicarbonate and water, dried and subjected to fractional distillation at reduced pressure. The desired product, comprising 1,2,3,4,7,7-hexachloro-5-(o-aminobenzyl)-2-norbornene is separated therefrom.

A molecular proportion of the above mentioned norbornene compound and 2 molecular proportions of ethylene oxide are placed in a reaction vessel and heated to a temperature of about 125° C. in the presence of 0.7 g. of sodium acetate. The autoclave and contents thereof are maintained at this temperature for a period of about 1.5 hours, at the end of which time they are allowed to cool to room temperature. The reaction product is washed with water, then with pentane, dried and fractionally distilled at reduced pressure, the desired products, comprising 1,2,3,4,7,7 - hexachloro-5-[N-(5-hydroxy - 3-oxapentyl)-o-aminobenzyl]-2-norbornene, and the corresponding N,N-bis(hydroxyethyl) compound, 1,2,3,4,7,7-hexachloro - 5 - [N,N-di-(2-hydroxyethyl) - o - aminobenzyl]-2-norbornene, being separated therefrom. The isomers may be separated by chromatographic methods. The N,N-bis-hydroxyethyl compound may be formed exclusively if the oxyethylation reaction is carried out thermally i.e. in the absence of an alkaline catalyst such as sodium acetate.

*Example II*

A solution of 13.3 g. (0.1 mole) of o-allylaniline and 12.3 g. (0.1 mole) of 2,3-dichloro-1,3-butadiene in 50 g. of benzene is heated under reflux conditions for a period of about 6 hours after which time the product, comprising 1,2-dichloro-4-(o-aminobenzyl)-1-cyclohexene, is recovered and treated as described in Example I above. One molecular proportion of the cyclohexene compound is reacted with 2 molecular proportions of ethylene oxide as hereinabove described and the desired condensation products, comprising 1,2-dichloro - 4 - [N-(5-hydroxy-3-oxapentyl)-o-aminobenzyl]-1-cyclohexene and the corresponding N,N-bis-(hydroxyethyl) derivative, 1,2-dichloro-4-[N,N-di-(2-hydroxyethyl)-o-aminobenzyl] - 1 - cyclohexene are separated and recovered.

*Example III*

A solution of 19.2 g. (0.1 mole) of 1,2,3,4-tetrachloro-1,3-butadiene and 13.3 g. (0.1 mole) of p-allylaniline in 50 g. of xylene is heated under reflux conditions for a period of about 6 hours, after which the product is recovered in a manner similar to that set forth in Examples I and II above. The condensation product, comprising 1,2,3,6-tetrachloro-4-(p-aminobenzyl)-1 - cyclohexene, is recovered and reacted with 8 molecular proportions of ethylene oxide per molecular proportion of the cyclohexene compound. The desired products, comprising 1,2,3,6 - tetrachloro-4-[N-(23-hydroxy-3,6,9,12, 15, 18,21 - heptaoxatricosyl)-p-aminobenzyl]-1-cyclohexene, together with other N-oxyethylated and N,N-bisoxyethylated analogs averaging 8 oxyethyl groups per mole are separated and recovered by conventional means.

*Example IV*

A solution of 11.9 g. (0.1 mole) of o-vinylaniline and 27.3 g. (0.1 mole) of hexachlorocyclopentadiene is refluxed in benzene in a manner similar to that described in Example I above. The reaction product, comprising 1,2,3,4,7,7 - hexachloro-5-(o-aminophenyl)-2-norbornene is recovered and reacted with ethylene oxide in a mole ratio of 2 moles of ethylene oxide per mole of norbornene compound. The desired products, comprising 1,2,3,4,7,7 - hexachloro - 5-[N-(5-hydroxy-3-oxapentyl)-o-aminophenyl]-2-norbornene and the corresponding N,N-bis-hydroxyethyl compound, 1,2,3,4,7,7-hexachloro-5-[N,N - di - (2 - hydroxyethyl)-o-aminophenyl]-2-norbornene, are separated and recovered.

*Example V*

A solution of 13.3 g. of p-allylaniline and 27.3 g. of hexachlorocyclopentadiene is refluxed in toluene in a manner similar to that set forth in Example I above. The reaction product of this condensation comprising 1,2,3,-4,7,7-hexachloro-5-(p-aminobenzyl)-2-norbornene is recovered by conventional means hereinabove described and reacted with ethylene oxide in a mole ratio of 2 moles of ethylene oxide per mole of norbornene compound. The desired products, comprising 1,2,3,4,7,7-hexachloro-5-[N-(5-hydroxy-3-oxapentyl) - p - aminobenzyl]-2-norbornene and the corresponding N,N-bis-hydroxyethyl compound, 1,2,3,4,7,7-hexachloro-5-[N,N-di - (2-hydroxyethyl)-p-aminobenzyl]-2-norbornene, are separated and recovered.

*Example VI*

In this example the two steps in the procedure for obtaining the desired compound are reversed. One molecular proportion of p-vinylaniline is reacted with two molecular proportions of ethylene oxide. The resultant compound, N-(5-hydroxy-3-oxapentyl)-p-vinylaniline is then refluxed with hexachlorocyclopentadiene in benzene in a manner similar to that set forth in the above Examples. At the end of the residence time the desired product comprising 1,2,3,4,7,7-hexachloro-5-[N-(5-hydroxy-3-oxapentyl)-p-aminobenzyl]-2-norbornene is separated and recovered.

*Example VII*

A solution of 13.3 g. of p-allylaniline and 27.3 g. of hexachlorocyclopentadiene is refluxed in toluene in a manner similar to that set forth in Example I above. The reaction product, comprising 1,2,3,4,7,7-hexachloro-5-(p-aminobenzyl)-2-norbornene is recovered and reacted with propylene oxide in a mole ratio of 4 moles of propylene oxide per mole of norbornene compound. The desired products comprising 1,2,3,4,7,7-hexachloro-5-[N-11-hydroxy-3,6,9 - trioxa-2,5,8-trimethyl-undecyl)-p-aminobenzyl]-2-norbornene, the corresponding N,N-bis - (hydroxyhexyl) compound, 1,2,3,4,7,7 - [N,N-di-(5-hydroxy-2,5-dimethyl-3-oxahexyl) - p - aminobenzyl]-2-norbornene, and other N-oxypropylated and N,N-bis-oxypropylated analogs averaging 4-oxypropyl groups per molecular are separated and recovered.

*Example VIII*

An insecticidal composition is prepared by dissolving 1 g. of 1,2,3,4,7,7-hexachloro-5-[N-(5-hydroxy-3-oxapentyl)-o-aminobenzyl]-2-norbornene in 2 cc. of benzene and adding 100 cc. of water, the benzene solution of the above named compound being emulsifiable therein in the absence of any emulsifying agent. This solution is sprayed into a cage containing common houseflies and causes a 100% knock-down and eventual kill.

Similar tests of other products of Examples I to VI show that these compounds also exhibit an effective knock-down ability with essentially equal killing power as compared to other insecticides which require the use of an emulsifying agent to make the latter water-dispersible.

We claim as our invention:
1. A compound having the structural formula selected from the group consisting of

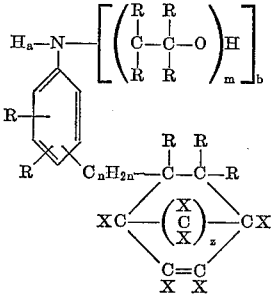

and

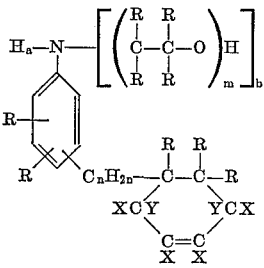

in which the R substituents are selected from the group consisting of hydrogen, methyl and ethyl radicals, the X substituents are selected from the group consisting of hydrogen, methyl and halogen radicals, the Y substituents are selected from the group consisting of hydrogen, methyl and halo-methyl radicals, $m$ is an integer of from 1 to about 20, $n$ is an integer of from 0 to 1, $z$ is an integer from 1 to 2, $b$ is an integer of from 1 to 2 and $a$ is $(2-b)$.

2. A chloro[N-(hydroxyoxaalkyl)-aminophenyl]cycloalkene.

3. A chloro[N-(hydroxyoxaalkyl)-aminophenyl]norbornene.

4. 1,2,3,4,7,7-hexachloro - 5 - [N-(11-hydroxy-3,6,9-trioxa-2,5,8-trimethyl - undecyl) - p-aminobenzyl]-2-norbornene.

5. 1,2,3,6 - tetrachloro - 4-[N-(23-hydroxy - 3,6,9,12,-15,18,21 - heptaoxatricosyl)-p-aminobenzyl]-1-cyclohexene.

6. 1,2,3,4,7,7-hexachloro - 5 - [N-(5-hydroxy-3-oxapentyl)-p-aminophenyl]-2-norbornene.

7. 1,2,3,4,7,7-hexachloro - 5 - [N-(5-hydroxy-3-oxapentyl)-o-aminobenzyl]-2-norbornene.

8. 1,2,3,4,7,7 - hexachloro - 5 - [N-(5-hydroxy-3-oxapentyl)-p-aminobenzyl]-2-norbornene.

References Cited in the file of this patent
UNITED STATES PATENTS

| | | |
|---|---|---|
| 2,161,322 | Stiendorff et al. | June 6, 1939 |
| 2,673,172 | Polen et al. | Mar. 23, 1954 |
| 2,721,882 | Schmerling | Oct. 25, 1955 |
| 2,876,263 | Mark | Mar. 3, 1959 |
| 2,901,510 | Molotsky et al. | Aug. 25, 1959 |